United States Patent
Melo et al.

(10) Patent No.: US 12,405,132 B2
(45) Date of Patent: Sep. 2, 2025

(54) APPARATUS AND METHOD FOR MATCHING POI ENTITIES

(71) Applicant: HUAWEI TECHNOLOGIES CO., LTD., Shenzhen (CN)

(72) Inventors: Andre Melo, Edinburgh (GB); Btissam Er-Rahmadi, Edinburgh (GB); Jeff Pan, Edinburgh (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 18/325,838

(22) Filed: May 30, 2023

(65) Prior Publication Data

US 2023/0296406 A1 Sep. 21, 2023

Related U.S. Application Data

(63) Continuation of application No. PCT/EP2021/052313, filed on Feb. 1, 2021.

(51) Int. Cl.
*G06F 16/00* (2019.01)
*G01C 21/00* (2006.01)
(Continued)

(52) U.S. Cl.
CPC ..... *G01C 21/3881* (2020.08); *G06F 16/9027* (2019.01); *G06F 16/909* (2019.01)

(58) Field of Classification Search
CPC .................................................. G06F 16/909
See application file for complete search history.

(56) References Cited

U.S. PATENT DOCUMENTS 9,441,983 B2   9/2016   Wong et al.
9,529,855 B2   12/2016   Westhafer et al.
(Continued)

FOREIGN PATENT DOCUMENTS

CN   101388023 A   3/2009
CN   104572645 B   7/2020

OTHER PUBLICATIONS

Li et al., "Different Sourcing Point of Interest Matching Method Considering Multiple Constraints," International Journal of Geo-Information, pp. 1-16, MDPI, Basel, Switzerland (Accepted: Mar. 27, 2020; Published: Mar. 31, 2020).
(Continued)

*Primary Examiner* — Ajith Jacob
(74) *Attorney, Agent, or Firm* — Leydig, Voit & Mayer, Ltd.

(57) ABSTRACT

An apparatus is provided for matching a first point of interest (POI) dataset including first POI entities with a second POI dataset including a plurality of second POI entities in a 2D region. Each of the first and second POI entities includes coordinate data and one or more label tokens. The apparatus includes processing circuitry configured to determine, for each first POI entity, a subset of the plurality of second POI entities. The processing circuitry is configured to determine, for each first POI entity, a composite matching score with one or more second POI entities. The composite matching score is based on a coordinate matching score and a label matching score, the coordinate matching score depending on a geographical distance and the label matching score depending on a local context relevance. The processing circuitry is configured to match each first POI entity with the second POI entities of the subset.

20 Claims, 6 Drawing Sheets

(51) Int. Cl.
      *G06F 16/901*    (2019.01)
      *G06F 16/909*    (2019.01)

(56)              References Cited

U.S. PATENT DOCUMENTS

| | | |
|---|---|---|
| 10,506,373 B2 | 12/2019 | Warren et al. |
| 2011/0010364 A1 | 1/2011 | Ahtisaari et al. |
| 2014/0258310 A1 | 9/2014 | Wong et al. |
| 2018/0260417 A1 | 9/2018 | Mahadevan et al. |
| 2021/0334275 A1* | 10/2021 | Smart ................. G06F 16/2456 |

OTHER PUBLICATIONS

Sehgal et al., "Entity Resolution in Geospatial Data Integration," ACM-GIS'06, Arlington, Virginia, USA, pp. 83-90 (Nov. 10-11, 2006).

Melo et al., "Alignment of Geographical Entities," COVID'19, Coronaville, District of Corona, Coronaland, Total 11 pages (Nov. 2019).

Zhang et al., "Multi-View Embedding Learning for Incompletely Labeled Data," Proceedings of the Twenty-Third International Joint Conference on Artificial Intelligence, pp. 1910-1916 (Aug. 2013).

Deng et al., "Point of Interest Matching between Different Geospatial Datasets," International Journal of Geo-Information, pp. 1-18, MDPI, Basel, Switzerland (Accepted: Sep. 29, 2019; Published: Oct. 1, 2019).

* cited by examiner

APPARATUS AND METHOD FOR MATCHING POI ENTITIES

CROSS-REFERENCE TO RELATED APPLICATIONS

This application is a continuation of International Application No. PCT/EP2021/052313, filed on Feb. 1, 2021, the disclosure of which is hereby incorporated by reference in its entirety.

TECHNICAL FIELD

The present disclosure relates to information processing technology. More specifically, the present disclosure relates to an apparatus and method for matching POI entities, i.e. aligning geographical entities from heterogeneous sources.

BACKGROUND

With the rapid development of ubiquitous cyberspace and internet information collection technologies, a large number of point of interest (POI) entities were and are being aggregated into geospatial databases by, for instance, map service providers and social networks. Integrating or fusing such multisource spatial data is a major challenge for current applications based on web-based information retrieval, spatial analysis, and spatial decision-making. This is because, geographic information collected from different data sources often has inconsistencies, redundancy, ambiguity, and conflicts. Additionally, different platforms typically provide different description attributes for the same POI entity. Furthermore, the description attributes provided by the same platform for the same geospatial object might differ in terms of temporal precision, positional accuracy, and semantic precision. Thus, there is a need for improved apparatuses and methods for matching or aligning the different attributes of POI entities to obtain more complete information about these objects.

SUMMARY

The present disclosure provides an improved apparatus and method for matching POI entities.

According to a first aspect an apparatus for matching, i.e. aligning a first point of interest (POI) dataset including one or more first POI entities with a second POI dataset including a plurality of second POI entities in a 2D region is provided. Each of the first POI entities comprises first coordinate data, such as first latitude and longitude data, and one or more first label tokens indicative of a label of the first POI entity, such as a name of the first POI entity. Likewise, each of the second POI entities comprises second coordinate data, such as second latitude and longitude data, and one or more second label tokens indicative of a label of the second POI entity, such as a name of the second POI entity.

The POI matching apparatus comprises a processing circuitry configured to determine, i.e. select for each of the one or more first POI entities based on the first coordinate data of the one or more first POI entities a respective subset of candidate POI entities of the plurality of second POI entities. In case there is only one first POI entity to be matched to the plurality of second POI entities, the processing circuitry will select one subset of the plurality of second POI entities as the candidate POI entities that may match the one first POI entity. In case there is more than one first POI entity to be matched to the plurality of second POI entities, the processing circuitry will select the corresponding number of subsets of the plurality of second POI entities as the respective candidate POI entities that may match the respective first POI entity.

The processing circuitry of the POI matching apparatus is further configured to determine for each of the one or more first POI entities a respective composite matching score (also referred to as similarity score) with one or more second candidate POI entities of the respective subset of the plurality of second POI entities. The respective composite matching score is based on a coordinate matching score and a label matching score, wherein the coordinate matching score depends on a geographical distance between the respective first POI entity and the respective second POI entity defined by the first and second coordinate data and wherein the label matching score depends on a local context relevance of the one or more first label tokens of the respective first POI entity. As used herein and as will described in more detail further below, the local context relevance of the one or more first label tokens of the respective first POI entity is a measure of how relevant the one or more first label tokens of the respective first POI entity are for the matching decision within the local context of such label tokens as defined by the plurality of label tokens of the second candidate POI entities of the respective subset of the plurality of second POI entities.

The processing circuitry of the POI matching apparatus is further configured to match, i.e. align, based on the composite matching score, each of the one or more first POI entities with the second POI entities of the respective subset of the plurality of second POI entities. For instance, the processing circuitry of the POI matching apparatus may match a respective first POI entity with that second POI entity that provides together with the respective first POI entity the highest composite matching score.

In a further possible implementation form of the first aspect, each of the first POI entities further comprises one or more first address tokens indicative of an address of the first POI entity, such as a street name or a city name, and each of the second POI entities further comprises one or more second address tokens indicative of an address of the second POI entity. In this case the processing circuitry is configured to determine the composite matching score based on the coordinate matching score, the label matching score and an address matching score, wherein the address matching score depends on a local context relevance of the one or more first address tokens of the respective first POI entity.

In a further possible implementation form of the first aspect, the processing circuitry is configured to generate for each subset of candidate POI entities of the plurality of second POI entities a respective document based on the one or more second label tokens and/or the one or more second address tokens of the second POI entities belonging to the respective subset of the plurality of second POI entities and to determine the local context relevance of the one or more first label tokens and/or the one or more first address tokens of the respective first POI entity as an inverse document frequency, IDF, of the one or more first label tokens and/or the one or more first address tokens of the respective first POI entity in the respective document.

In a further possible implementation form of the first aspect, the processing circuitry of the POI matching apparatus is configured to determine the local context relevance of the one or more first label tokens and/or the one or more first address tokens of the respective first POI entity (and, thus, the label matching score and/or the address matching score) based on a local IDF-weighted Jaccard similarity.

In a further possible implementation form of the first aspect, the processing circuitry of the POI matching apparatus is configured to determine the composite matching score as a weighted sum of the coordinate matching score and the label matching score and/or the address matching score.

In a further possible implementation form of the first aspect, the one or more first POI entities comprise a first POI entity, wherein the processing circuitry is configured to determine, i.e. select based on the first coordinate data of the first POI entity the subset of the plurality of second POI entities, i.e. the candidate second POI entities, by determining the second POI entities of the plurality of second POI entities located in the vicinity of the first POI entity. For instance, the processing circuitry may be configured to determine all the second POI entities that are located within in a circle centered on the position of the first POI entity. The processing circuitry may be further configured to determine or adjust a radius of this circle based on the type of the first POI entity. For instance, for a first POI entity of the type airport the processing circuitry may choose a larger radius of this circle than for a first POI entity of the type restaurant.

In a further possible implementation form of the first aspect, the processing circuitry is configured to determine, i.e. select for each of the one or more first POI entities of the first POI dataset based on the first coordinate data of the one or more first POI entities a respective subset of the plurality of second POI entities of the second POI dataset by spatially partitioning the 2D region into a plurality of partitioning cells.

In a further possible implementation form of the first aspect, for each partitioning cell a product of the number of first POI entities and second POI entities located in the respective partitioning cell is smaller than or equal to a predefined threshold value N.

In a further possible implementation form of the first aspect, the spatial partitioning is a quadtree partitioning of the 2D region, wherein different partitioning cells may have different sizes.

In a further possible implementation form of the first aspect, each partitioning cell has a substantially rectangular, in particular substantially quadratic shape and comprises a frame-shaped boundary region surrounding the partitioning cell, wherein the ratio of the area of the boundary region to the area of the partition cell depends on a local density of the plurality of first POI entities and/or the plurality of second POI entities.

In a further possible implementation form of the first aspect, the label matching score is further based on a label embedding score between a first label embedding vector based on the one or more first label tokens of the first POI entity and a second label embedding vector based on the one or more second label tokens of the second POI entity. For instance, the label embedding score may be based on a vector similarity measure (for instance, the cosine similarity or dot product) between the first label embedding vector and the second label embedding vector.

In a further possible implementation form of the first aspect, the processing circuitry of the POI matching apparatus is further configured to reduce the number of second POI entities of each respective subset of candidate POI entities of the plurality of second POI entities by first determining the label embedding score between each of the one or more first POI entities and the one or more second candidate POI entities of the respective subset of the plurality of second POI entities and removing one or more of the one or more second candidate POI entities from the respective subset that have the lowest label embedding score.

In a further possible implementation form of the first aspect, each of the first POI entities further comprises one or more first types and each of the second POI entities further comprises one or more second types, wherein the composite matching score is further based on a type matching score between the one or more first types of the first POI entity and the one or more second types of the second POI entity.

In a further possible implementation form of the first aspect, the type matching score is based on a type embedding score indicative of the similarity between a first type embedding vector based on the one or more first types of the first POI entity and a second type embedding vector based on the one or more second types of the second POI entity. In an implementation form, the processing circuitry is configured to determine the type matching score as the type embedding score reduced by a type demotion score. The type embedding score itself may be determined on the basis of the dot product between the first type embedding vector and the second type embedding vector.

In a further possible implementation form of the first aspect, the processing circuitry is further configured to reduce the number of second POI entities of each respective subset of candidate POI entities of the plurality of second POI entities by determining the type embedding score between each of the one or more first POI entities and the one or more second candidate POI entities of the respective subset of the plurality of second POI entities and removing one or more of the one or more second candidate POI entities from the respective subset that have the lowest type embedding score.

In a further possible implementation form of the first aspect, the apparatus is further configured to implement an unsupervised machine learning scheme configured to determine the first type embedding vector based on the one or more first types of the first POI entity and the second type embedding vector based on the one or more second types of the second POI entity.

In a further possible implementation form of the first aspect, the apparatus further comprises a memory configured to store the second POI dataset including the plurality of second POI entities. The memory may be operating a database for storing the second POI dataset including the plurality of second POI entities.

In a further possible implementation form of the first aspect, the apparatus further comprises a communication interface configured to receive the first POI dataset including the one or more first POI entities.

According to a second aspect a method for matching a first point of interest (POI) dataset including one or more first POI entities with a second POI dataset including a plurality of second POI entities in a 2D region is provided. Each of the first POI entities comprises first coordinate data and one or more first label tokens indicative of a label of the first POI entity. Each of the second POI entities comprises second coordinate data and one or more second label tokens indicative of a label of the second POI entity. The method comprises the steps of:

determining, i.e. selecting for each of the one or more first POI entities based on the first coordinate data of the one or more first POI entities a respective subset of candidate POI entities of the plurality of second POI entities;

determining for each of the one or more first POI entities a respective composite matching score with one or more second candidate POI entities of the respective subset of the plurality of second POI entities, wherein the respective composite matching score is based on a coordinate matching score and a label matching score, wherein the coordinate matching score depends on a geographical distance between the respective first POI entity and the respective second POI entity and wherein the label matching score depends on a local context relevance of the one or more label tokens of the respective first POI entity; and matching, based on the composite matching score, each of the one or more first POI entities with the second POI entities of the respective subset of the plurality of second POI entities.

In a further possible implementation form of the second aspect, each of the first POI entities further comprises one or more first address tokens indicative of an address of the first POI entity and each of the second POI entities further comprises one or more second address tokens indicative of an address of the second POI entity, wherein the composite matching score is based on the coordinate matching score, the label matching score and an address matching score, wherein the address matching score depends on a local context relevance of the one or more first address tokens of the respective first POI entity.

The POI matching method according to the second aspect can be performed by the POI matching apparatus according to the first aspect. Thus, further features of the POI matching method according to the second aspect result directly from the functionality of the POI matching apparatus according to the first aspect as well as its different implementation forms and embodiments described above and below.

According to a third aspect a computer program product is provided, comprising a non-transitory computer-readable storage medium for storing program code which causes a computer or a processor to perform the POI matching method according to the second aspect, when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

In the following embodiments of a POI matching apparatus will be described in more detail.

Figure 1:
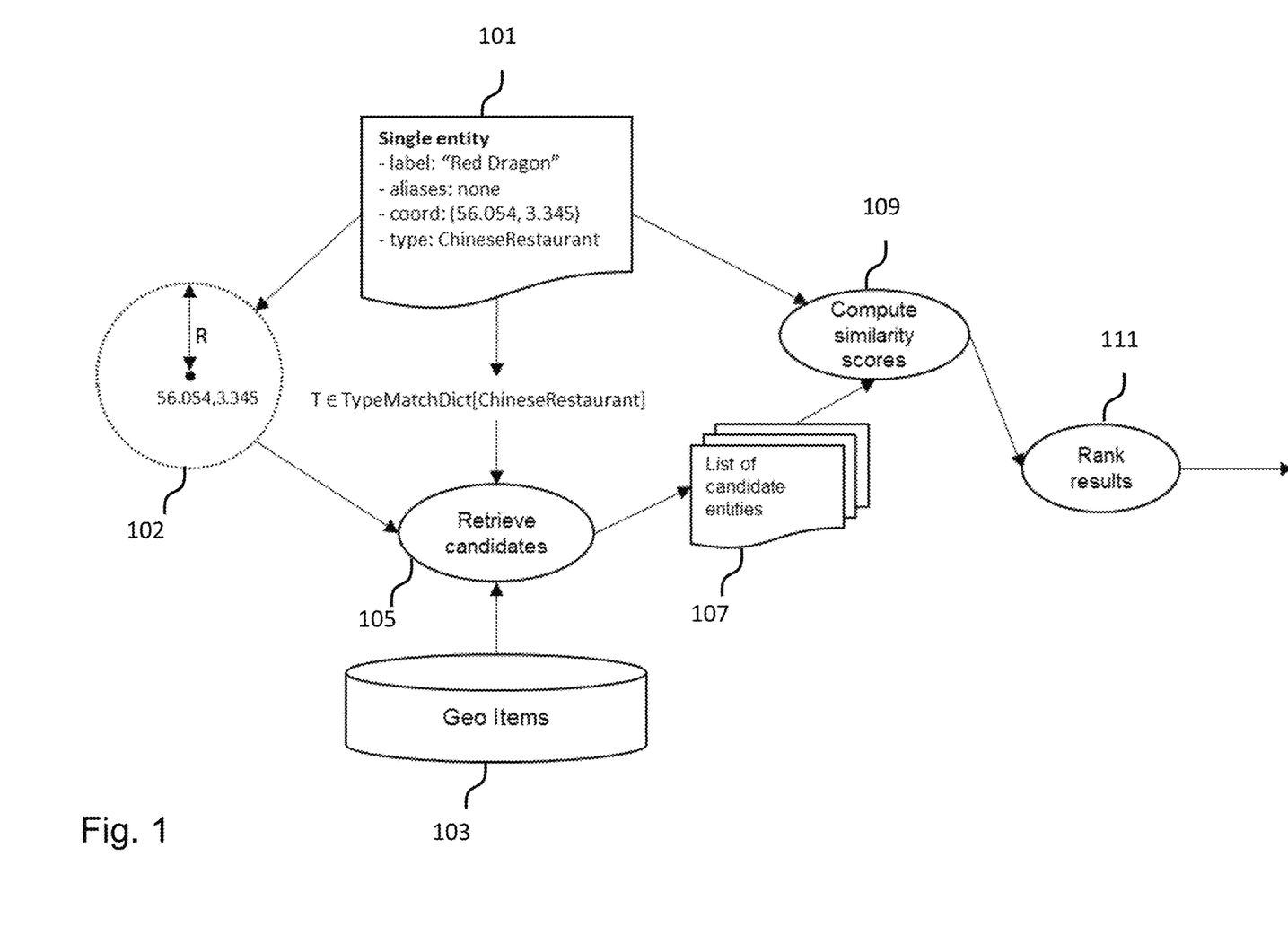
FIG. 1 shows a schematic diagram illustrating aspects of a POI matching apparatus according to an embodiment in an online matching scenario.

FIG. 1 shows a schematic diagram illustrating aspects of the POI matching apparatus according to an embodiment in an online matching scenario, where there is an existing POI dataset (in the following referred to as the dataset of second POI entities 103) and a new POI entity (in the following referred to as first POI entity 101) needs to be matched against the already existing ones. A common application for this use case is the addition of user-generated POI entities into an existing POI dataset, where it is necessary to check whether the new POI entity already exists before actually adding it in order to avoid duplication. In an embodiment, the POI matching apparatus may be implemented as a cloud server, which may further comprise a communication interface configured to receive the first POI dataset including the one or more first POI entities. 101, for instance, via the Internet.

Figure 2:
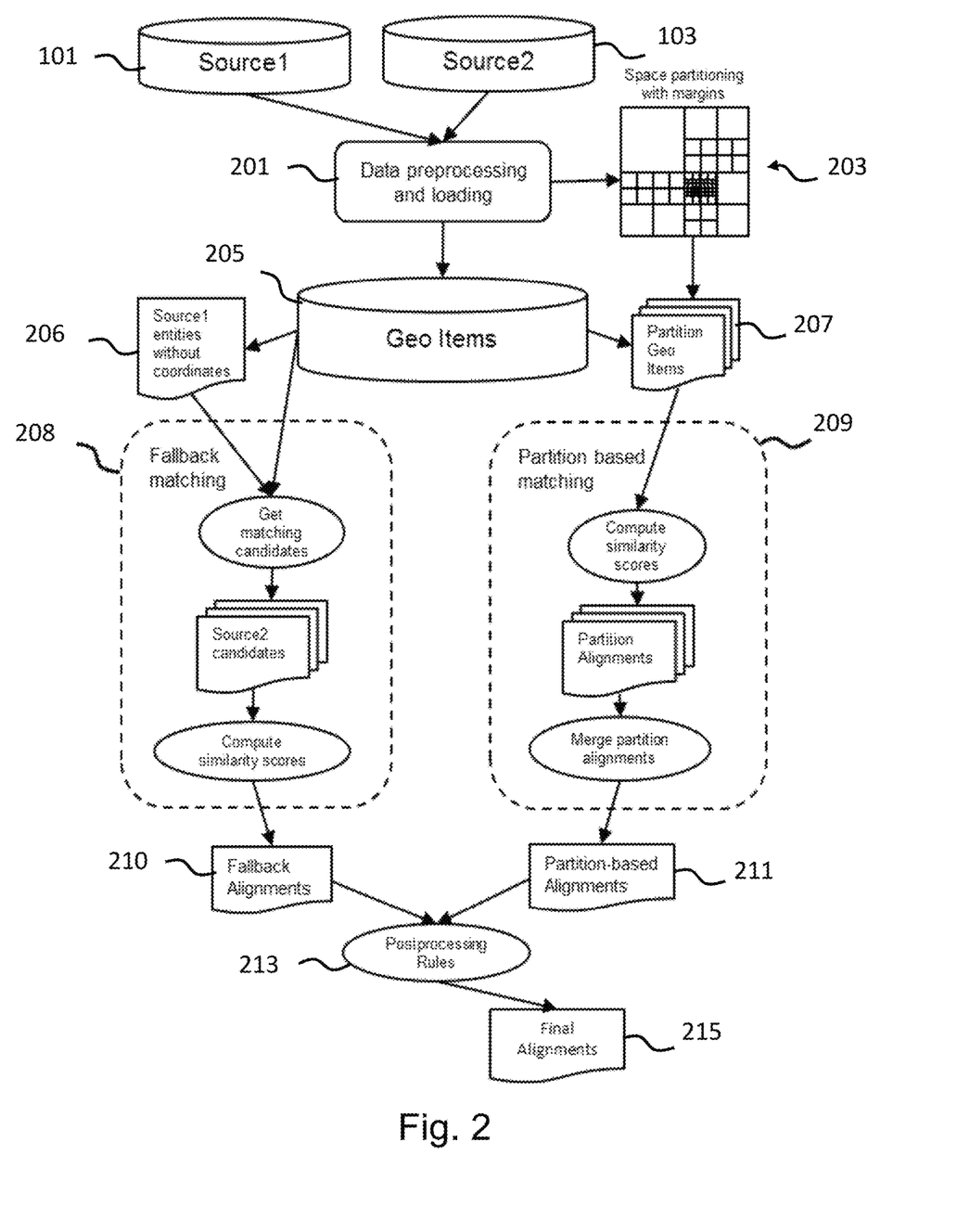
FIG. 2 shows a schematic diagram illustrating aspects of a POI matching apparatus according to an embodiment in an offline matching scenario.

FIG. 2 shows a schematic diagram illustrating aspects of the POI matching apparatus according to a further embodiment in an offline matching scenario. In such an offline case, the POI matching apparatus is configured to match two large POI datasets against each other at a global scale. A good example of such case is when a map provider wants to expand its dataset of POI entities by incorporating a dataset acquired from an external provider. In this setup, there can be some overlap between the two datasets, and not all POI entities of either datasets can be matched. It is common that the POI datasets being aligned are heterogeneous and have different levels of incompleteness. Some of the main differences between datasets can be in their type hierarchies, labels and address format and coordinate availability. It can be challenging to find matches on a global scale, with datasets possibly having tens or hundreds of millions of entities each, which would lead to quadrillions of possible matching pairs. Thus, in an embodiment, the POI matching apparatus may comprise a memory configured to store the first and second POI dataset including the plurality of first and second POI entities 101, 103. The memory may be operating a database for storing the first and second POI dataset.

Thus, generally, the POI matching apparatus is configured to match, i.e. align a first point of interest (POI) dataset including one or more first POI entities 101 with a second POI dataset including a plurality of second POI entities 103 in a 2D spatial region, such as a city. Each of the one or more first POI entities 101 comprises first coordinate data, such as first latitude and longitude data, and one or more first label tokens indicative of a label of the first POI entity, such as a name of the first POI entity. Likewise, each of the second POI entities 103 comprises second coordinate data, such as second latitude and longitude data, and one or more second label tokens indicative of a label of the second POI entity, such as a name of the second POI entity.

The POI matching apparatus comprises a processing circuitry configured to determine, i.e. select for each of the one or more first POI entities 101 based on the first coordinate data of the one or more first POI entities 101 a respective subset of candidate POI entities of the plurality of second POI entities 103. In the online matching case illustrated in FIG. 1, where there is only one (or a few) first POI entity 101 to be matched to the plurality of second POI entities 103, the processing circuitry will select one subset of the plurality of second POI entities 103 as the candidate POI entities that may match the one first POI entity. In the offline matching case illustrated in FIG. 2, where there is more than one first POI entity 101 to be matched to the plurality of second POI entities 103, the processing circuitry will select the corresponding number of subsets of the plurality of second POI entities 103 as the respective candidate POI entities that may match the respective first POI entity 101.

The processing circuitry of the POI matching apparatus is further configured to determine for each of the one or more first POI entities 101 a respective composite matching score (herein also referred to as similarity score) with one or more second candidate POI entities of the respective subset of the plurality of second POI entities 103. The respective composite matching score is based on a coordinate matching score and a label matching score, wherein the coordinate matching score depends on a geographical distance between the respective first POI entity and the respective second POI entity (as defined by the first and second coordinate data) and wherein the label matching score depends on a local context relevance of the one or more first label tokens of the respective first POI entity. As used herein and as will described in more detail further below, the local context relevance of the one or more first label tokens of the respective first POI entity is a measure of how relevant the one or more first label tokens of the respective first POI entity are for the matching score/decision within the local context of such label tokens as defined by the plurality of label tokens of the second candidate POI entities of the respective subset of the plurality of second POI entities 103.

The processing circuitry of the POI matching apparatus is further configured to match, i.e. align, based on the composite matching score, each of the one or more first POI entities 101 with the second POI entities of the respective subset of the plurality of second POI entities 103. For instance, the processing circuitry of the POI matching apparatus may match a respective first POI entity with that second POI entity that provides together with the respective first POI entity the highest composite matching score.

As already described above, FIG. 1 shows a schematic diagram illustrating aspects of the POI matching apparatus according to an embodiment in an online matching scenario, where there might only be a single first POI entity 101 to be matched with an existing dataset of second POI entities 103 (referred to as "Geo Items" in FIG. 1). In this case, the processing circuitry may be configured to determine, i.e. retrieve in a "Retrieve candidates" 105 stage, based on the first coordinate data of the first POI entity 101, the subset of the plurality of second POI entities 103, i.e. the candidate second POI entities 107, by determining the second POS entities of the plurality of second POI entities 103 located in the vicinity of the first POI entity 101. For instance, as illustrated in FIG. 1, the processing circuitry may be configured to determine all the second POI entities 103 that are located within a circle 102 centered on the position of the first POI entity 101 (which in FIG. 1 has the exemplary coordinate data 56.054, 3.345). In an embodiment, the processing circuitry may be further configured to determine or adjust the radius of this circle 102 based on the type of the first POI entity 101. For instance, for a first POI entity 101 of the type airport the processing circuitry may choose a larger radius of this circle 102 than for a first POI entity 101 of the type restaurant. As already described above, the subset or list of second candidate POI entities 107 is used for computing the matching or similarity scores and ranking the results for performing the matching (see processing stages 109 and 111 of FIG. 1).

As already described above, FIG. 2 shows a schematic diagram illustrating aspects of the POI matching apparatus according to an embodiment in an offline matching scenario, i.e. where two large POI datasets (referred to as "Source 1" 101 and "Source 2" 103 in FIG. 2) are matched against each other. In an embodiment, the processing circuitry of the POI matching apparatus may be configured to implement a pre-processing and loading stage 201 of the plurality of first POI entities 101 and the plurality second POI entities 103.

Figure 3:
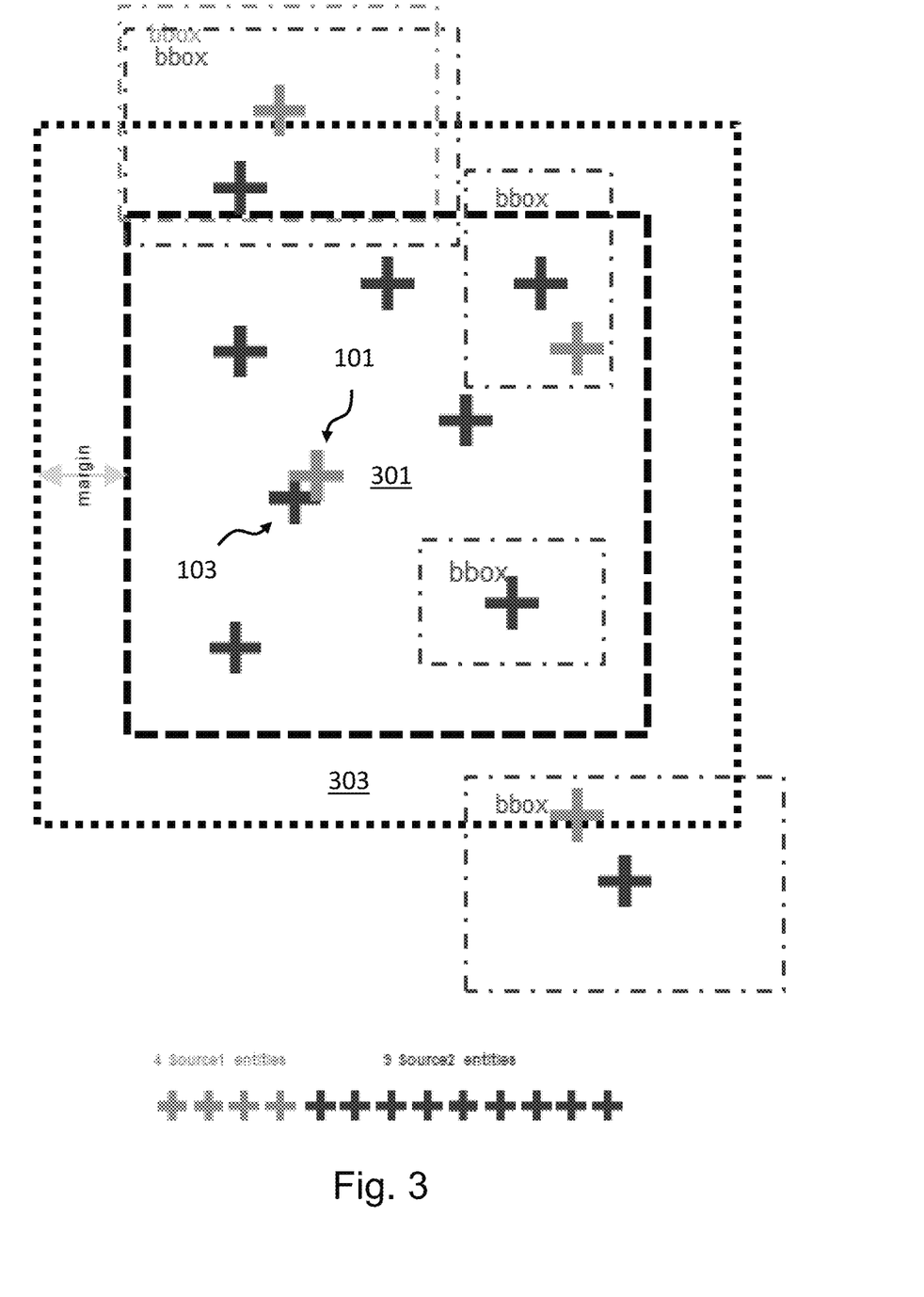
FIG. 3 shows a schematic diagram illustrating positions of a plurality of exemplary first POI entities and second POI entities within a partitioning cell used by a POI matching apparatus according to an embodiment.

As illustrated by the reference sign 203 in FIG. 2, the processing circuitry may be configured to determine, i.e. select for each of the plurality of first POI entities 101 of the first POI dataset based on the first coordinate data of the respective first POI entity 101 a respective subset of the plurality of second POI entities 103 of the second POI dataset by spatially partitioning the 2D spatial region into a plurality of partitioning cells for providing the partitioned second POI entities 103 in 207 based on the pre-processed second POI entities from block 205. An example of such a partitioning cell 301 including a couple of first POI entities 101 and a couple of second POI entities 103 (which may further define a bounding box) is shown in FIG. 3. In an embodiment, the spatial partitioning may be a quadtree partitioning of the 2D region, wherein different partitioning cells 301 may have different sizes. As illustrated in FIGS. 2 and 3, each partitioning cell 301 may have a rectangular, in particular quadratic shape and may comprise a frame-shaped boundary region 303 surrounding the partitioning cell 301. In an embodiment, also POI entities located within the boundary region 303 of the partitioning cell 301 may be treated as belonging to the portioning cell 301. In an embodiment, the ratio of the area of the boundary region 303 to the area of the partition cell 301 may depend on a local density of the plurality of first POI entities and/or the plurality of second POI entities. For instance, the processing circuitry may choose a boundary region 303 with a small size in POI dense regions, while choosing a larger size for the boundary region 303 in regions, where there are less POI entities. In a further embodiment, the processing circuitry of the POI matching apparatus may select the size of each partitioning cell 301 such that a product of the number of first POI entities 101 and second POI entities 103 located in the respective partitioning cell 301 is smaller than or equal to a predefined threshold value N. This allows limiting the computational complexity of the matching process.

In the embodiment shown in FIG. 2 the POI matching apparatus implements the following additional processing stages (some of which already have been described above): a fallback partition based matching stage 208 which is configured to handle POI entities 206 without coordinate data and a partition based matching stage 209, which implements the matching process based on the composite matching score already described above. The outputs 210, 211 of the fallback partition based matching stage 208 and the partition based matching stage 209 may be post-processed 213 and output as final alignments, i.e. matches 215.

In an embodiment, each of the one or more first POI entities 101 may comprise in addition to the one or more first label tokens one or more first address tokens indicative of an address of the respective first POI entity 101, such as a street name or a city name where the first POI entity 101 is located. Likewise, each of the plurality of second POI entities 103 may further comprise one or more second address tokens indicative of an address of the second POI entity. In this case the processing circuitry of the POI matching apparatus may be configured to determine the composite matching score based on the coordinate matching score, the label matching score and an address matching score, wherein the address matching score depends on a local context relevance of the one or more first address tokens of the respective first POI entity within the local context as defined by the plurality of address tokens of the plurality of second POI entities 103.

Figure 4A:
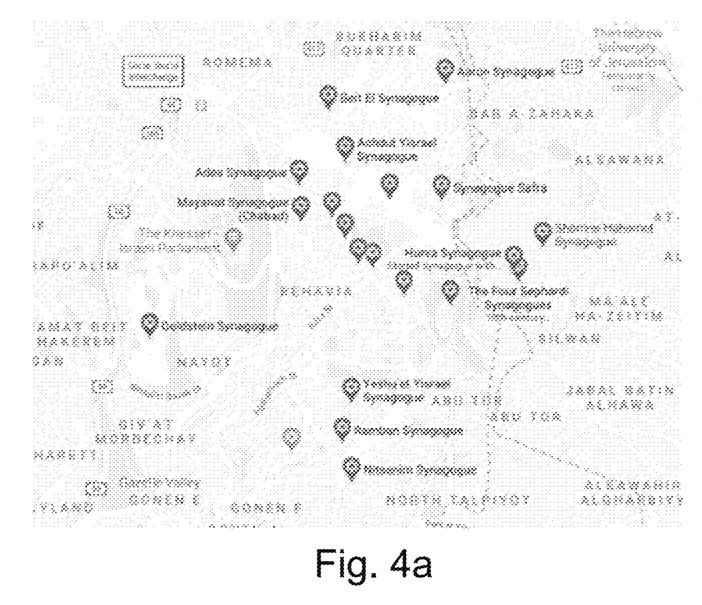
FIGS. 4a and 4b show two exemplary distributions of POI entities of a certain type within different geographical contexts as used by a POI matching apparatus according to an embodiment for POI matching.
Figure 4B:
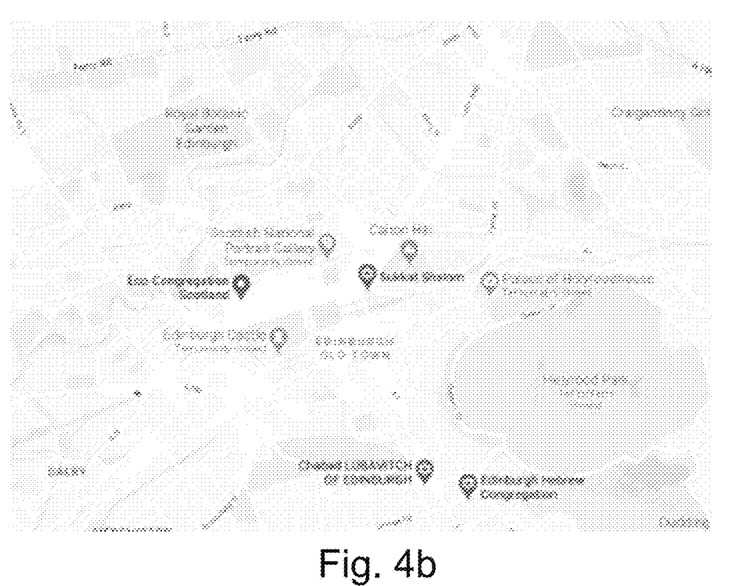

The local context relevance is very important when computing label and/or address similarities as the same tokens might have different levels of relevance in different geographical contexts. This is illustrated by the example shown in FIGS. 4a and 4b, which illustrate the frequency of POI entities of the label "synagogue" in West Jerusalem (FIG. 4a) and Edinburgh (FIG. 4b). In an embodiment, the processing circuitry of the POI matching apparatus is configured to generate for each subset of candidate POI entities of the plurality of second POI entities a respective document based on the one or more second label tokens and/or the one or more second address tokens of the second POI entities belonging to the respective second subset of the plurality of second POI entities and to determine the local context relevance of the one or more first label tokens and/or the one or more first address tokens of the respective first POI entity 101 as an inverse document frequency, IDF, of the one or more first label tokens and/or the one or more first address tokens of the respective first POI entity in the respective document. In other words, in an embodiment, concatenations of the plurality of label and/or address tokens of the candidate second POI entities are considered as documents d∋D, wherein D denotes the set of documents contained in a geographical context. In an embodiment, the processing circuitry may be configured to determine the IDF on the basis of the following equation:

$$IDF(t, D) = \log\left(\frac{|D|}{|d \in D : t \in d|}\right),$$

wherein t denotes the respective token of the first POI entity 101. In a further embodiment, the processing circuitry of the POI matching apparatus may be configured to determine the local context relevance of the one or more first label tokens and/or the one or more first address tokens of the respective first POI entity 101 (and, thus, the label matching score and/or the address matching score) based on a local IDF-weighted Jaccard similarity.

In an embodiment, the processing circuitry of the POI matching apparatus may be configured to determine the composite matching score as a weighted sum of the coordinate matching score and the label matching score and/or the address matching score.

In an embodiment, each of the first POI entities 101 further comprises one or more first types and each of the second POI entities 103 further comprises one or more second types, wherein the composite matching score is further based on a type matching score between the one or more first types of the first POI entity and the one or more second types of the second POI entity.

In an embodiment, the label matching score is further based on a label embedding score between a first label embedding vector based on the one or more first label tokens of the first POI entity 101 and a second label embedding vector based on the one or more second label tokens of the second POI entity 103. For instance, the label embedding score may be based on a on a vector similarity measure (for instance, the cosine similarity or dot product) between the first label embedding vector and the second label embedding vector.

In an embodiment, the type matching score is based on a type embedding score indicative of the similarity between a first type embedding vector based on the one or more first types of the first POI entity 101 and a second type embedding vector based on the one or more second types of the second POI entity 103 and a type demotion score. In an embodiment, the processing circuitry of the POI matching apparatus is configured to determine the type matching score as the type embedding score reduced by a type demotion score. The type embedding score itself may be determined on the basis of the dot product between the first type embedding vector and the second type embedding vector.

In an embodiment, the POI matching apparatus is further configured to implement an unsupervised machine learning scheme configured to determine the first type embedding vector based on the one or more first types of the first POI entity 101 and the second type embedding vector based on the one or more second types of the second POI entity 103.

In an embodiment, the processing circuitry of the POI matching apparatus may be further configured to reduce the number of second POI entities 103 of each respective subset of candidate POI entities of the plurality of second POI entities 103 by first determining the label embedding score between each of the one or more first POI entities 101 and the one or more second candidate POI entities of the respective subset of the plurality of second POI entities 103 and removing one or more of the one or more second candidate POI entities from the respective subset that have the lowest label embedding score.

In addition or alternatively, the processing circuitry of the POI matching apparatus may be further configured to reduce the number of second POI entities of each respective subset of candidate POI entities of the plurality of second POI entities 102 by determining the type embedding score between each of the one or more first POI entities and the one or more second candidate POI entities of the respective subset of the plurality of second POI entities 103 and removing one or more of the one or more second candidate POI entities from the respective subset that have the lowest type embedding score.

Figure 5:
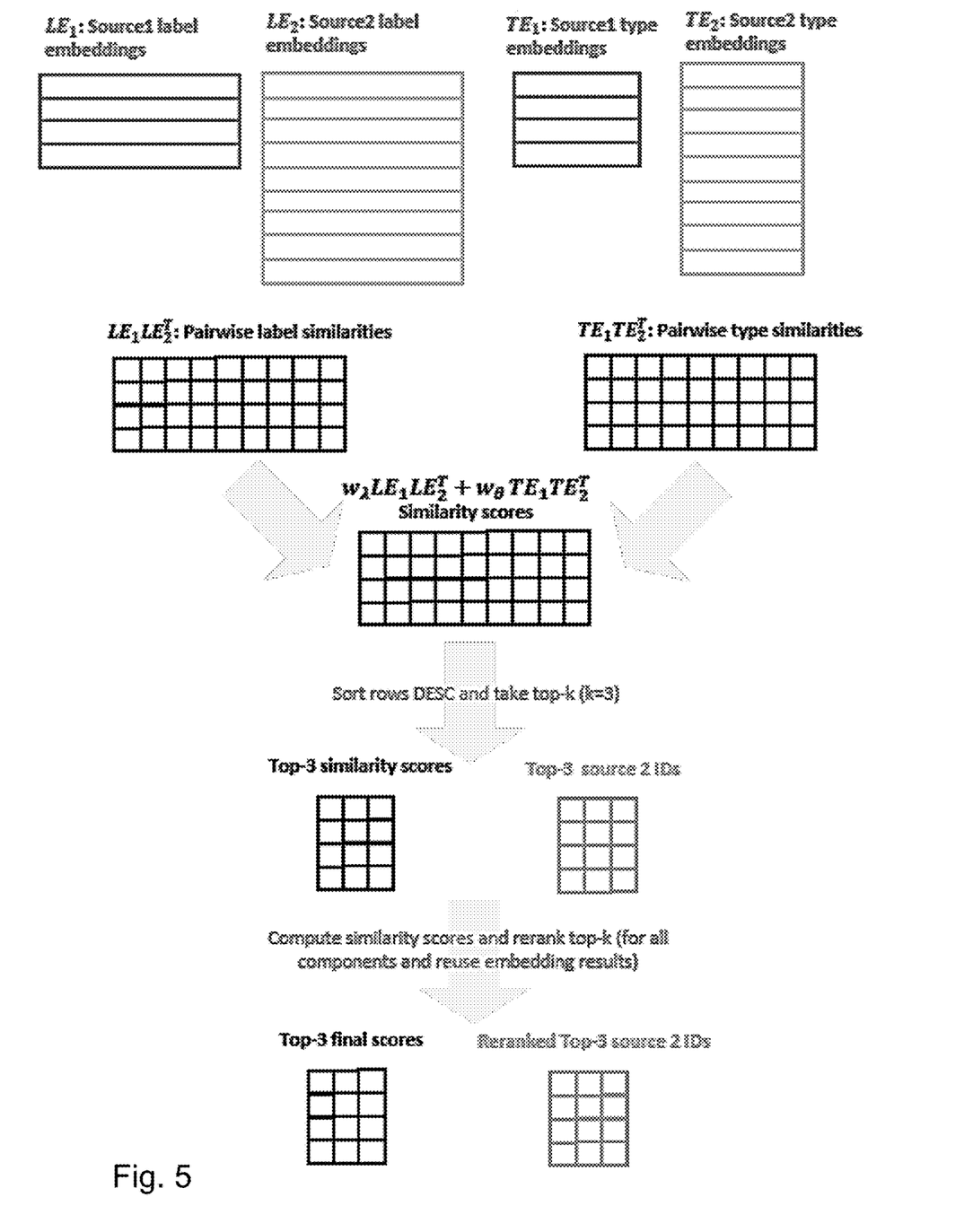
FIG. 5 shows a schematic diagram illustrating an early stage of the scoring process implemented by a POI matching apparatus according to an embodiment for reducing the number of POI entity pairs to be matched.

This reduction of the number of second candidate POIs 103 allows reducing the computational complexity of the matching process and is further illustrated by the example shown in FIG. 5. In a first stage, the label and address embedding vectors are computed for the first POI entities 101 and the second POI entities 103 located within a partitioning cell, such as the exemplary partitioning cell 301 shown in FIG. 3. These vectors are combined in a matrix computation and preliminary matching, i.e. similarity scores are determined on the basis thereof. The three first POI entities 101 and the three second POI entities 103 having the largest preliminary matching scores are selected and only for these the full composite matching scores are determined in the way described above.

Figure 6:
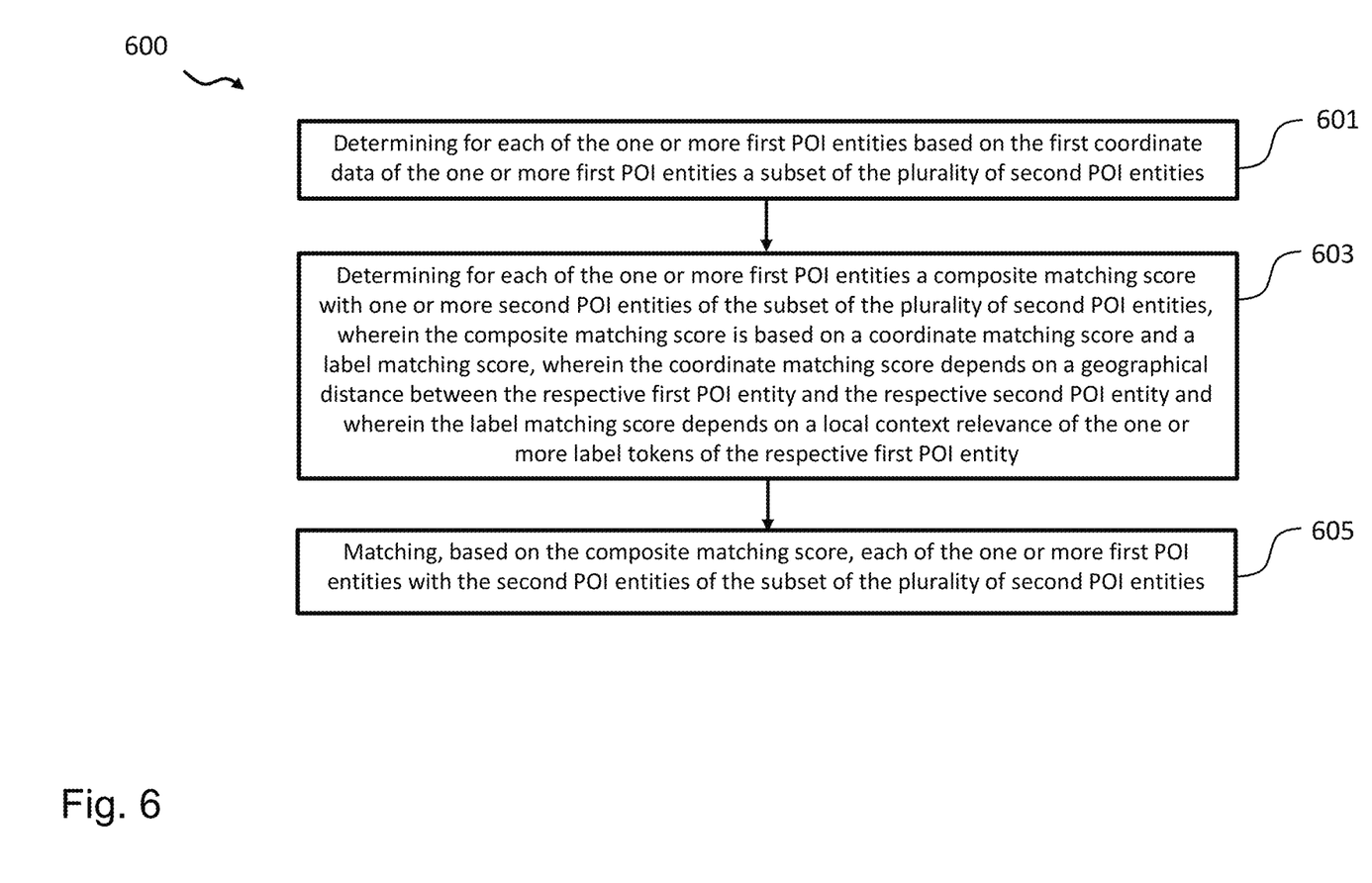
FIG. 6 is a flow diagram illustrating a POI matching method according to an embodiment.

FIG. 6 is a flow diagram illustrating a POI matching method 600 according to an embodiment. The method 600 comprises the steps of:

determining, i.e. selecting 601 for each of the one or more first POI entities 101 based on the first coordinate data of the one or more first POI entities 101 a respective subset of candidate POI entities of the plurality of second POI entities 103;

determining 603 for each of the one or more first POI entities 101 a respective composite matching score with one or more second candidate POI entities of the respective subset of the plurality of second POI entities 103, wherein the respective composite matching score is based on a coordinate matching score and a label matching score, wherein the coordinate matching score depends on a geographical distance between the respective first POI entity 101 and the respective second POI entity 103 and wherein the label matching score depends on a local context relevance of the one or more label tokens of the respective first POI entity 101; and matching 605, based on the composite matching score, each of the one or more first POI entities 101 with the second POI entities of the respective subset of the plurality of second POI entities 103.

In a further embodiment of the method 600, each of the first POI entities further comprises one or more first address tokens indicative of an address of the first POI entity and each of the second POI entities further comprises one or more second address tokens indicative of an address of the second POI entity, wherein the composite matching score is based on the coordinate matching score, the label matching score and an address matching score, wherein the address matching score depends on a local context relevance of the one or more first address tokens of the respective first POI entity.

The POI matching method 600 may be performed by the POI matching apparatus. Thus, further features of the POI matching method 600 result directly from the functionality of the POI matching apparatus and its different embodiments described above and below.

The person skilled in the art will understand that the "blocks" ("units") of the various figures (method and appa-ratus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. An apparatus for matching a first point of interest (POI) dataset including one or more first POI entities with a second POI dataset including a plurality of second POI entities in a 2D region, each respective first POI entity of the first POI entities comprising first coordinate data and one or more first label tokens indicative of a label of the respective first POI entity, each respective second POI entity of the second POI entities comprising second coordinate data and one or more second label tokens indicative of a label of the second POI entity, the apparatus comprising:

processing circuitry configured to:
determine, for each respective first POI entity of the one or more first POI entities based on the first coordinate data of the one or more first POI entities, a subset of the plurality of second POI entities;
determine, for each respective first POI entity of the one or more first POI entities, a composite matching score with each of one or more respective second POI entities of the subset of the plurality of second POI entities, wherein the composite matching score is based on a coordinate matching score and a label matching score, wherein the coordinate matching score depends on a geographical distance between the respective first POI entity and the respective second POI entity, and wherein the label matching score depends on a local context relevance of the one or more first label tokens of the respective first POI entity; and
match, based on the composite matching score, each respective first POI entity of the one or more first POI entities with the second POI entities of the subset of the plurality of second POI entities.

2. The apparatus of claim 1, wherein each of the one or more first POI entities further comprises one or more first address tokens and each of the plurality of second POI entities further comprises one or more second address tokens, wherein the composite matching score determined for each respective first POI entity of the one or more first POI entities is further based on an address matching score, wherein the address matching score depends on a local context relevance of the one or more first address tokens of the respective first POI entity.

3. The apparatus of claim 2, wherein the processing circuitry is further configured to:

generate, for each subset of the plurality of second POI entities, a document based on the one or more second label tokens and/or the one or more second address tokens of the second POI entities belonging to the subset of the plurality of second POI entities, and determine the local context relevance of the one or more first label tokens and/or the local context relevance of the one or more first address tokens of the respective first POI entity as an inverse document frequency (IDF) of the one or more first label tokens and/or the one or more first address tokens of the respective first POI entity in the respective document.

4. The apparatus of claim 3, wherein the processing circuitry is configured to determine the local context relevance of the one or more first label tokens and/or the local context relevance of the one or more first address tokens of the respective first POI entity based on a local IDF-weighted Jaccard similarity.

5. The apparatus of claim 2, wherein the processing circuitry is configured to determine the composite matching score as a weighted sum of at least two of: the coordinate matching score, the label matching score, or the address matching score.

6. The apparatus of claim 1, wherein the one or more first POI entities comprises a first POI entity, and wherein the processing circuitry is configured to determine, based on the first coordinate data of the first POI entity, the subset of the plurality of second POI entities by determining the second POI entities of the plurality of second POI entities located in a vicinity of the first POI entity.

7. The apparatus of claim 1, wherein the processing circuitry is configured to determine, for each of the one or more first POI entities of the first POI dataset based on the first coordinate data of the one or more first POI entities, the subset of the plurality of second POI entities of the second POI dataset by spatially partitioning the region into a plurality of partitioning cells.

8. The apparatus of claim 7, wherein, for each partitioning cell, a product of the number of first POI entities and second POI entities located in the partitioning cell is smaller than or equal to a predefined threshold value.

9. The apparatus of claim 7, wherein the spatial partitioning is a quadtree partitioning of the region.

10. The apparatus of claim 9, wherein each partitioning cell has a rectangular shape and comprises a frame-shaped boundary region surrounding the partitioning cell, wherein the ratio of the area of the boundary region to the area of the partitioning cell depends on a local density of the plurality of first POI entities and/or the plurality of second POI entities.

11. The apparatus of claim 1, wherein the label matching score is further based on a label embedding score between a first label embedding vector based on the one or more first label tokens of the first POI entity and a second label embedding vector based on the one or more second label tokens of the second POI entity.

12. The apparatus of claim 11, wherein the processing circuitry is further configured to reduce the number of second POI entities of each subset of the plurality of second POI entities by determining the label embedding score between each of the one or more first POI entities and the one or more second POI entities of the subset of the plurality of second POI entities and removing at least one of the one or more second POI entities from the subset that has a lowest label embedding score.

13. The apparatus of claim 1, wherein each of the first POI entities further comprises one or more first types and each of the second POI entities further comprises one or more second types, and wherein the composite matching score is further based on a type matching score between the one or more first types of the first POI entity and the one or more second types of the second POI entity.

14. The apparatus of claim 13, wherein the type matching score is based on a type embedding score indicative of a similarity between a first type embedding vector based on the one or more first types of the first POI entity and a second type embedding vector based on the one or more second types of the second POI entity.

15. The apparatus of claim 14, wherein the processing circuitry is further configured to reduce the number of second POI entities of each subset of the plurality of second POI entities by determining the type embedding score between each of the one or more first POI entities and the one or more second POI entities of the subset of the plurality of second POI entities and removing at least one of the one or more second POI entities from the subset that has a lowest type embedding score.

16. The apparatus of claim 14, wherein the apparatus is further configured to implement an unsupervised machine learning scheme configured to determine the first type embedding vector based on the one or more first types of the first POI entity and the second type embedding vector based on the one or more second types of the second POI entity.

17. The apparatus of claim 1, wherein the apparatus further comprises a memory configured to store the second POI dataset including the plurality of second POI entities.

18. The apparatus of claim 1, wherein the apparatus further comprises a communication interface configured to receive the first POI dataset including the one or more first POI entities.

19. A method for matching a first point of interest (POI) dataset including one or more first POI entities with a second POI dataset including a plurality of second POI entities in a 2D region, each of the first POI entities comprising first coordinate data and one or more first label tokens, each of the second POI entities comprising second coordinate data and one or more second label tokens, the method comprising:

determining, for each respective first POI entity of the one or more first POI entities based on the first coordinate data of the one or more first POI entities, a subset of the plurality of second POI entities;

determining, for each respective first POI entity of the one or more first POI entities, a composite matching score with one or more second POI entities of the subset of the plurality of second POI entities, wherein the composite matching score is based on a coordinate matching score and a label matching score, wherein the coordinate matching score depends on a geographical distance between the respective first POI entity and the respective second POI entity, and wherein the label matching score depends on a local context relevance of the one or more label tokens of the respective first POI entity; and matching, based on the composite matching score, each respective first POI entity of the one or more first POI entities with the second POI entities of the subset of the plurality of second POI entities.

20. The method of claim 19, wherein each of the first POI entities further comprises one or more first address tokens and each of the second POI entities further comprises one or more second address tokens, and wherein the composite matching score is further based on an address matching score, wherein the address matching score depends on a local context relevance of the one or more first address tokens of the respective first POI entity.

\* \* \* \* \*